United States Patent [19]
Johnson

[11] Patent Number: 6,041,809
[45] Date of Patent: Mar. 28, 2000

[54] TWO STAGE FLUSH CONTROL VALVE ASSEMBLY

[75] Inventor: Dwight N. Johnson, Carlsbad, Calif.

[73] Assignee: American Standard Inc., Piscataway, N.J.

[21] Appl. No.: 08/811,654

[22] Filed: Mar. 5, 1997

[51] Int. Cl.[7] ............................ F16K 11/18; F16K 21/04; E03D 3/04
[52] U.S. Cl. ............... 137/247.25; 137/601; 137/630.16; 251/23; 251/36; 251/51
[58] Field of Search .................................. 251/15, 23, 33, 251/36, 38, 39, 42, 45, 46, 47, 48, 51, 54, 55; 137/601, 628, 630.16, 247.25

[56] References Cited

U.S. PATENT DOCUMENTS

| | | | |
|---|---|---|---|
| 4,227,674 | 10/1980 | Grant, Jr. ................................... | 251/15 |
| 4,574,399 | 3/1986 | Sullivan ............................. | 137/247.25 |
| 4,662,602 | 5/1987 | Johnson .................................... | 251/44 |
| 4,817,913 | 4/1989 | Whiteside .................................. | 251/40 |
| 4,832,310 | 5/1989 | Nestich ..................................... | 251/46 |
| 5,184,640 | 2/1993 | Molligan ............................. | 137/247.25 |

*Primary Examiner*—George L. Walton

[57] ABSTRACT

A control valve assembly for flushing a sanitary fixture includes a burst valve for supplying flush water flow at the beginning of a flush cycle and an independently controlled bypass valve for providing trap reseal flow after the burst valve closes. The burst valve includes a timing sleeve cooperating with a lifting piston to define a timing chamber communicating with inlet pressure through an orifice. A piston collar cooperates with the lifting piston to define the bypass valve. A lifting chamber defined between the body and the lifting piston communicates with the outlet through a metering valve assembly. Actuation of the metering valve assembly empties the lifting chamber and lifts the timing sleeve, opening the burst valve. The burst valve is closed when the timing chamber fills at a rate controlled by the orifice. The bypass valve is maintained open by pressure differential across the bypass valve to supply trap reseal flow until the metering valve assembly recloses.

5 Claims, 6 Drawing Sheets

TWO STAGE FLUSH CONTROL VALVE ASSEMBLY

FIELD OF THE INVENTION

The present invention relates to an improved flush control valve assembly providing independently controlled flow stages for siphon flushing and trap refill.

DESCRIPTION OF THE PRIOR ART

Commercial and industrial water systems such as used in hotels, factories, airports and the like typically have higher flow capacities than residential water systems. In these high capacity systems, toilets are commonly provided without gravity flush tanks. Instead, sanitary fixtures are flushed by valve assemblies known as flushometer or metering valves. In a toilet flushing cycle, first a relatively large volume of flow is required to perform a flushing operation of a siphon jet or blow out fixture. Then a smaller volume of flow is needed to reseal the fixture trap. The operation of flushing a urinal is similar except that a smaller flow volume is needed for a urinal fixture wash down operation than is needed for a toilet flushing operation.

Typical flushometer valves include a single, slow closing valve member that is shaped to cooperate with a fixed valve seat to provide a larger initial flush flow followed by a smaller trap reseal flow. One example of a flushometer or metering valve is disclosed in U.S. Pat. No. 4,662,602. The metering plug 78 disclosed in U.S. Pat. No. 4,662,602 is one example of a single valve member configured to provide both an initial siphon flushing flow and a subsequent trap reseal flow.

The use of a single valve structure for both flushing and trap reseal makes compromises necessary and prevents design optimization for both separate functions. A disadvantage of known flushometer valves is that they cannot achieve a clear delineation between siphon flush flow and trap reseal flow. The gradual transition between flows inherent with a single valve structure can result in wastage of water, as well as insufficient flush flow to achieve consistent, reliable flushing of the fixture.

SUMMARY OF THE INVENTION

A principal object of the present invention is to provide an improved valve assembly for flushing a fixture and resealing the fixture trap. Another object is to provide a flush control valve assembly in which the siphon flushing operation and reseal operation are sharply delineated and are independently regulated to maximize operational effectiveness and minimize water usage. Another object is to provide a flush control valve assembly overcoming disadvantages of metering valves and flushometer valves used in the past.

In brief, in accordance with the present invention there is provided a valve assembly for supplying water to flush a sanitary fixture and to reseal a trap of the sanitary fixture. The valve assembly includes an actuator for initiating the flush cycle and a burst valve connected between a water supply and the fixture and operable between closed and open positions. The burst valve has a relatively unimpeded flow path for supplying a relatively high volume fixture flushing water flow to the fixture. The burst valve is opened in response to initiation of the flush cycle by the actuator. First regulating means closes the burst valve after a first volume of fixture flushing water flows through the burst valve. A bypass valve is connected between the water supply and the fixture and operates between closed and open positions. The bypass valve has a relatively impeded flow path for supplying a relatively low volume trap reseal water flow to the fixture. The bypass valve is maintained in the open position after closing of the burst valve. Second regulating means closes the burst valve after a second volume of trap reseal water flows through the fixture.

BRIEF DESCRIPTION OF THE DRAWING

The present invention together with the above and other objects and advantages may best be understood from the following detailed description of the preferred embodiment of the invention illustrated in the drawings, wherein.

DETAILED DESCRIPTION OF THE PREFERRED EMBODIMENT

Figure 1:
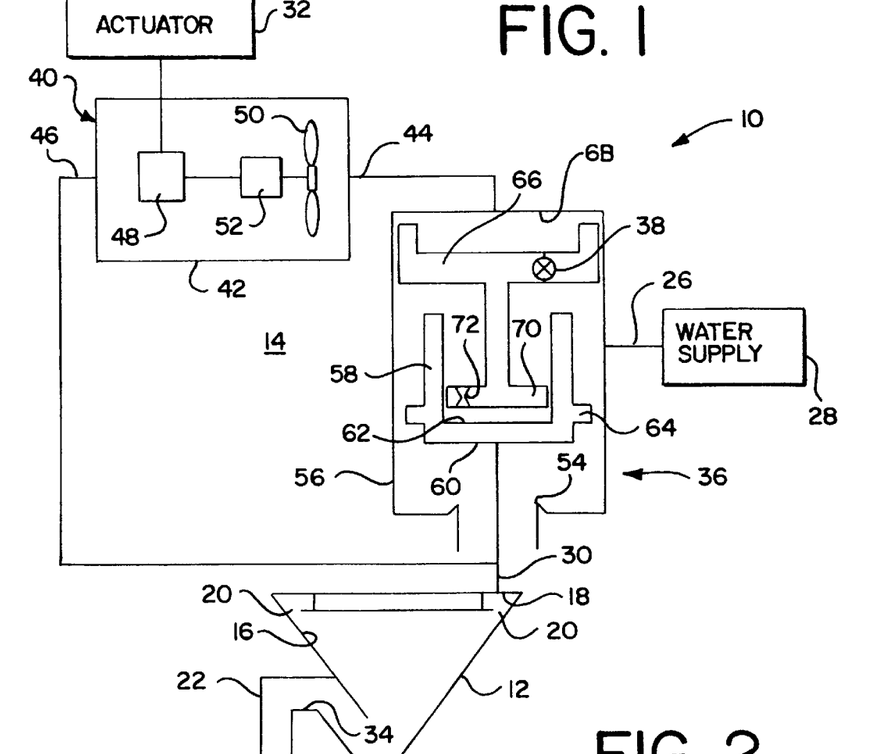
FIG. 1 is a simplified schematic diagram of portions of a water supply system including a sanitary fixture and a flush control valve assembly constructed in accordance with the present invention.
Figure 2:
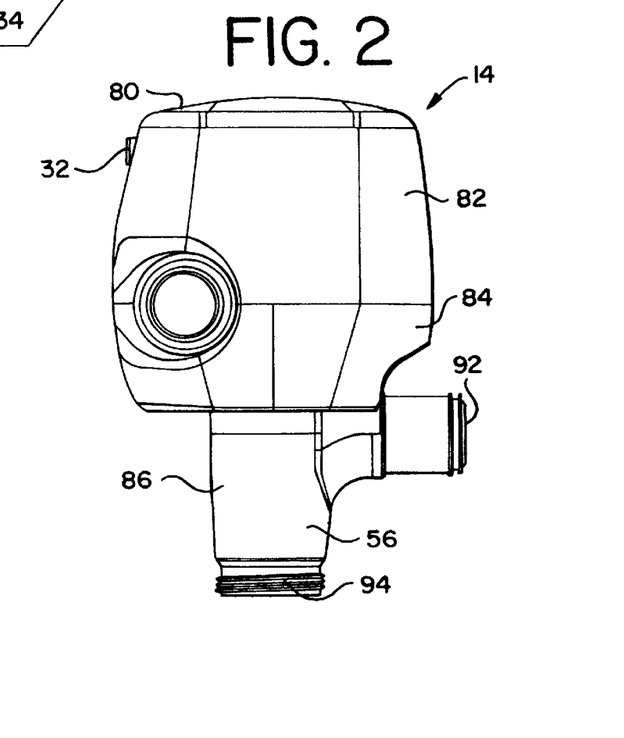
FIG. 2 is a side view of the flush control valve assembly constructed in accordance with the present invention.

Having reference now to the drawings, in FIG. 1 there is illustrated a water system 10 including a sanitary fixture 12 and a flush control valve assembly 14 embodying the principles of the present invention. As compared with the detailed disclosure of the assembly 14 as illustrated in FIGS. 2–8, the disclosure of FIG. 1 is simplified and schematic in nature. An initial description of the subject matter of FIG. 1 will assist in understanding the detailed disclosure set forth below in connection with FIGS. 2–8.

The water system 10 has a sufficiently high flow capacity that the siphon flush fixture 12 can be flushed without the need for a gravity water collection tank such as commonly found in lower capacity, residential water systems. The fixture 12 illustrated schematically in FIG. 1 is a toilet having a bowl 16, a rim inlet manifold 18 with wash down ports 20 and a siphon trap 22 extending from the bowl 16 to a drain 24.

The flush control valve assembly 14 has an inlet port 26 connected to a high capacity supply 28 of pressurized water and an outlet port 30 connected to the rim inlet manifold 18 of the fixture 12. When a flushing cycle of operation is initiated by an actuator 32, the valve assembly 14 first supplies a regulated burst of relatively large volume flow of water for flushing the fixture. This flush water flow enters the fixture bowl 16 and causes the bowl to empty by siphoning through the siphon trap 22. After the siphon flush, the assembly 14 supplies an independently regulated relatively smaller volume flow of water for refilling the siphon trap 22 to the level of a trap weir 34. When the regulated volume of reseal flow has been delivered, the valve assembly 14 discontinues flow to the fixture 12 and resets in preparation for the next flush cycle.

Valve assembly 14 includes a burst valve 36 for providing a regulated burst of flush water flow, a bypass valve 38 for providing a controlled flow rate of trap reseal flow and a metering valve assembly 40 for discontinuing the reseal flow when a regulated flow volume has been delivered.

The metering valve assembly 40 is disclosed in detail in U.S. Pat. No. 5,806,556 issued on Sep. 15, 1998, incorporated here by reference for a description beyond that needed for an understanding of the present invention. The metering valve assembly 40 has a housing 42 with an inlet port 44 and an outlet port 46. A control mechanism and valve system 48 is opened by operation of the actuator 32 to permit relatively unrestricted flow from the inlet port 44 to the outlet port 46. Flow through the valve assembly 40 is measured by a turbine wheel 50 connected through a gear assembly 52 to the control mechanism and valve system 48. After a predetermined, precisely measured volume of water flows through the assembly 40, the control mechanism and valve system 48 recloses to discontinue flow through the metering valve assembly 40.

The burst valve 36 includes a valve seat 54 defined on a body 56 and communicating with the outlet 30. A timing sleeve 58 includes a valve portion 60 that engages the seat 54 when the valve is closed. The timing sleeve 58 is movable within the body 56 between a lower valve closed position and an upper, valve open position seen in FIG. 1. The timing sleeve 58 has an interior timing chamber 62 and includes an outer restrictor structure 64 providing a flow restriction between the inlet and outlet ports 26 and 30 when the burst valve is open.

Disposed above the timing sleeve 58 is a lifting piston 66 that is slidably received in the body 56. A lifting chamber 68 is defined within the body 56 above the lifting piston 66 and is in communication with the inlet 44 of the metering valve assembly. The bypass valve 38 controls flow past the lifting piston 66 from the inlet port 26 to inlet 44 of metering valve assembly 40. A portion 70 of the lifting piston is slidably received within the timing sleeve 58 and defines the upper end of the timing chamber 62. An orifice 72 in the portion 70 permits restricted flow to the timing chamber 62.

In the normal, standby or inactive condition, the metering valve assembly 40 is closed, and the burst valve 36 is closed with the valve portion 60 engaging the seat 54. The lifting piston 66 is in its lowermost position. The volume of the timing chamber is minimized and the volume of the lifting chamber is maximized. The bypass valve 38 is closed. The interior of the body 56, including the lifting and timing chambers, is at inlet pressure because of the connection of the inlet port to the water supply 28.

In order to initiate a flush cycle, the actuator 32 is operated to permit flow through the metering valve assembly 40 by opening the control mechanism and valve system 48. The pressure at the inlet 44 of the metering valve assembly together with the pressure within the lifting chamber 68 drops abruptly, and the lifting piston 66 lifts quickly to the upper position seen in FIG. 1.

Water is trapped within the timing chamber 62, and the timing sleeve 58 is also drawn to the upper position seen in FIG. 1 together with the lifting piston 66. This quickly and fully opens the burst valve 36 by moving the valve portion 60 away from the valve seat 54. The volume of the lifting chamber 68 is minimized. A relatively large volume burst of water flows from the inlet 26 to the outlet 30 and into the fixture 12 for flushing the fixture.

The volume of flow through the burst valve is regulated by physical attributes of the burst valve including the volume of the timing chamber 62 and the relative sizes of the orifice 72 and the restriction imposed by the restrictor structure 64. As a result, the flow volume can be tailored to the siphon flush requirements of any particular fixture 12 so that efficient operation can be achieved and waste of water can be avoided.

The pressure drop across the timing sleeve 58 due to flow across the restrictor structure 64 urges the timing sleeve 58 down toward the valve closed position. The timing sleeve 58 therefore moves downward relative to the lifting piston 66. Movement in the downward direction is gradual due to the flow restriction of the orifice 72. The timing chamber 62 can only expand, permitting downward movement of the timing sleeve 58, as water enters the chamber 62 through the orifice 72. During this gradual downward movement, the timing sleeve 58 is in equilibrium and, over a wide range of possible inlet water pressures, the flow volume across the restrictor structure 64 to the outlet port 30 is larger than but directly proportional to the flow volume through the orifice 72 and into the timing chamber 62. The orifice 72 is sized to select a desired flow volume through the outlet port 30. When a precisely regulated volume of water has been supplied by the burst valve 38, the timing sleeve 58 reaches its lowermost position and the burst valve 36 closes.

The bypass valve 38 is associated with the lifting piston 66. When the metering valve assembly 40 is open and when the bypass valve 38 is also open, water flows from the inlet port 26 through the bypass valve and through the metering valve assembly 40 to the outlet port 30 and to the fixture 12.

The bypass valve 38 is normally biased to a closed position. The bypass valve 38 opens to permit flow from the inlet port 26 to the metering valve assembly 40 in response to a pressure differential across the bypass valve 38. After the lifting piston 66 reaches its uppermost position, the pressure across the bypass valve 38 increases. When the timing sleeve 58 reaches its lowermost position to close the burst valve 36, the pressure differential across the bypass valve 38 increases even more and maintains the bypass valve 38 fully open. The flow characteristics of the bypass valve 38 and related structure are such that flow is limited to a low volume sufficient to refill and reseal the fixture siphon trap 22 following the siphon flush operation.

The siphon flush flow and the reseal flow are separately and independently regulated and controlled. The metering valve assembly 40 regulates the volume of the trap reseal flow. When the total flow through the metering valve assembly 40 reaches a predetermined value, the metering valve assembly 40 closes to terminate flow from the flush control valve assembly 14 to the fixture 12. The volume of flow can be precisely tailored to the trap reseal requirements of a particular fixture 12 and can be tailored independently of the siphon flush flow requirements. The burst valve 36 closes completely when the optimum siphon flow volume is achieved, and there is a sharp delineation between siphon flush flow and trap reseal flow without water wastage that results from a gradual change of flow mode.

Referring now to FIGS. 2–8, the structure of the preferred embodiment of the flush control valve assembly 14 is illustrated in detail. The assembly 14 includes a casing 80 having a cover 82 and a base 84 to which is attached the body 56 including an outer shell 86, an outlet bell 88 and a piston cylinder 90. The inlet 26 includes an annular region encircling the piston cylinder 90 and freely communicating with an inlet fitting 92 of the outer shell 86. The outlet port 30 includes a central region 30A surrounded by a circumferential region 30B, both within an outlet fitting 94. A hub 96 is attached to the base 84. Openings 98 in the hub 96 restrict the rate of flow through the bypass valve 38.

Figure 3:
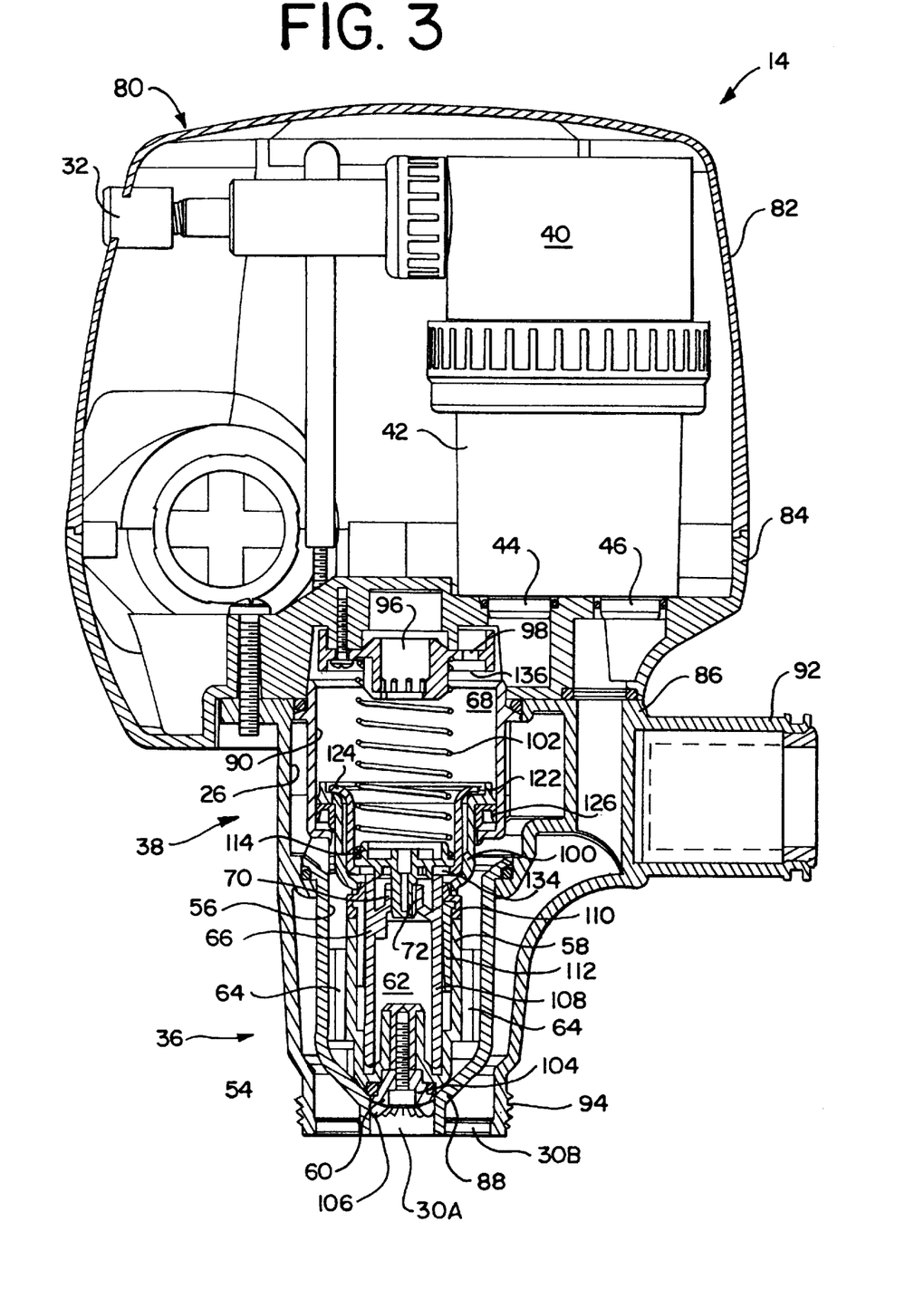
FIG. 3 is a vertical sectional view of the flush control valve assembly, illustrating the assembly in the closed, standby position.

Mounted for axial, vertical movement within the body 56 are the lifting piston 66, the timing sleeve 58 and a piston collar 100 that cooperates with the lifting piston 66 to form the bypass valve 38. A spring 102 captured under the hub 96 applies a downward force to the lifting piston 66.

The restrictor structure of the timing sleeve 58 takes the form of several axial ribs 64 (FIGS. 7 and 8) arrayed around the periphery of the sleeve body. In addition to providing restriction to flow from the inlet port 26 to the central outlet port 30A, these ribs also center and guide the timing sleeve for axial movement within the outlet bell 88. The burst valve 36 includes a seal 60 held to the lower end of the timing sleeve 58 by a seal retainer 104 that chokes the outlet flow to prevent water hammer as the burst valve 36 closes. The retainer 104 has ribs 106 that guide the timing sleeve 58 to its lowermost position and channel flow through the outlet 30A in a non swirling axial flow direction.

Figures 6, 7:
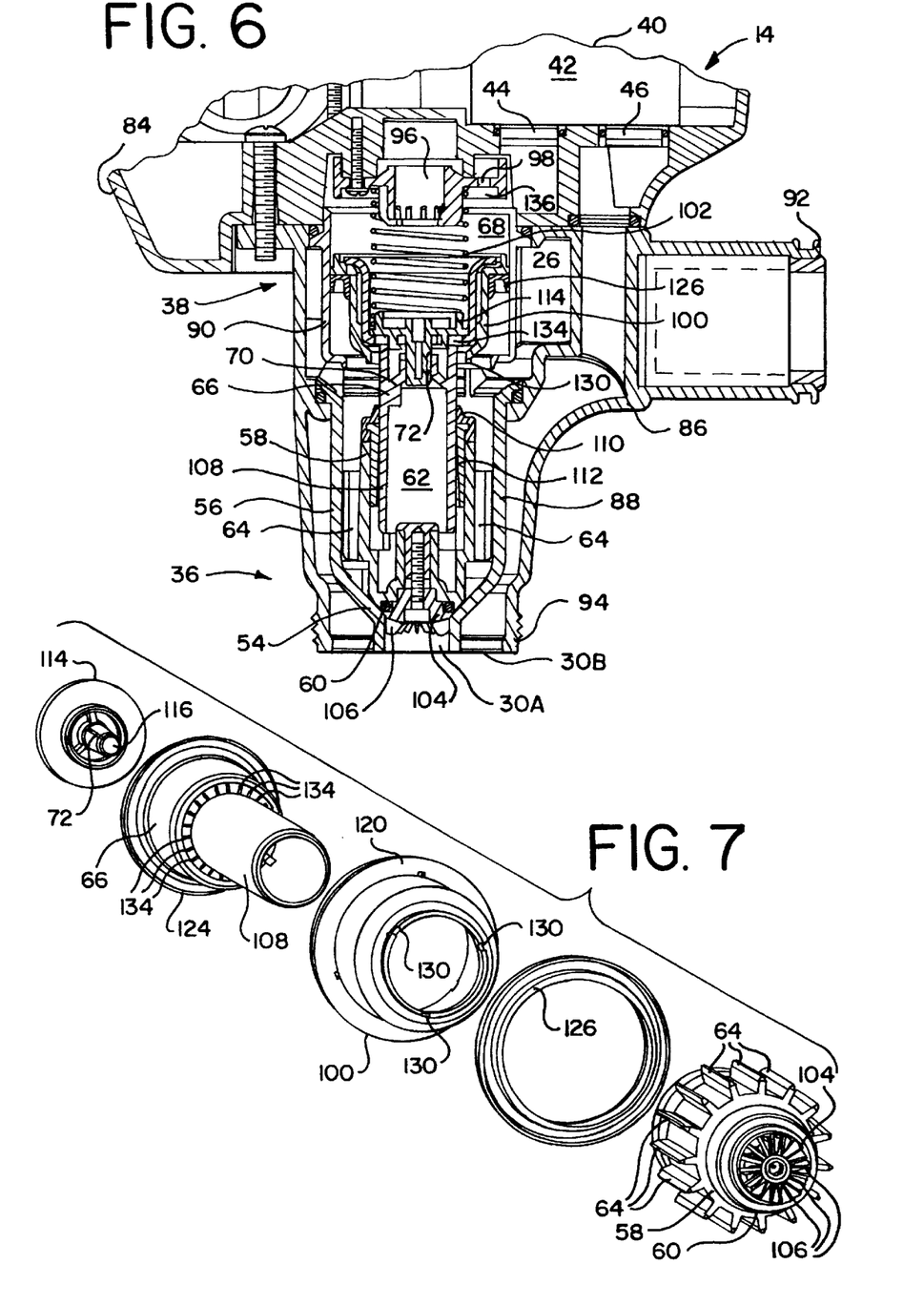
FIG. 6 is a view like FIGS. 4 and 5 illustrating the assembly resetting in preparation for another flush cycle.
FIG. 7 is an exploded isometric bottom view of components of the assembly of FIGS. 2–6.
Figure 8:
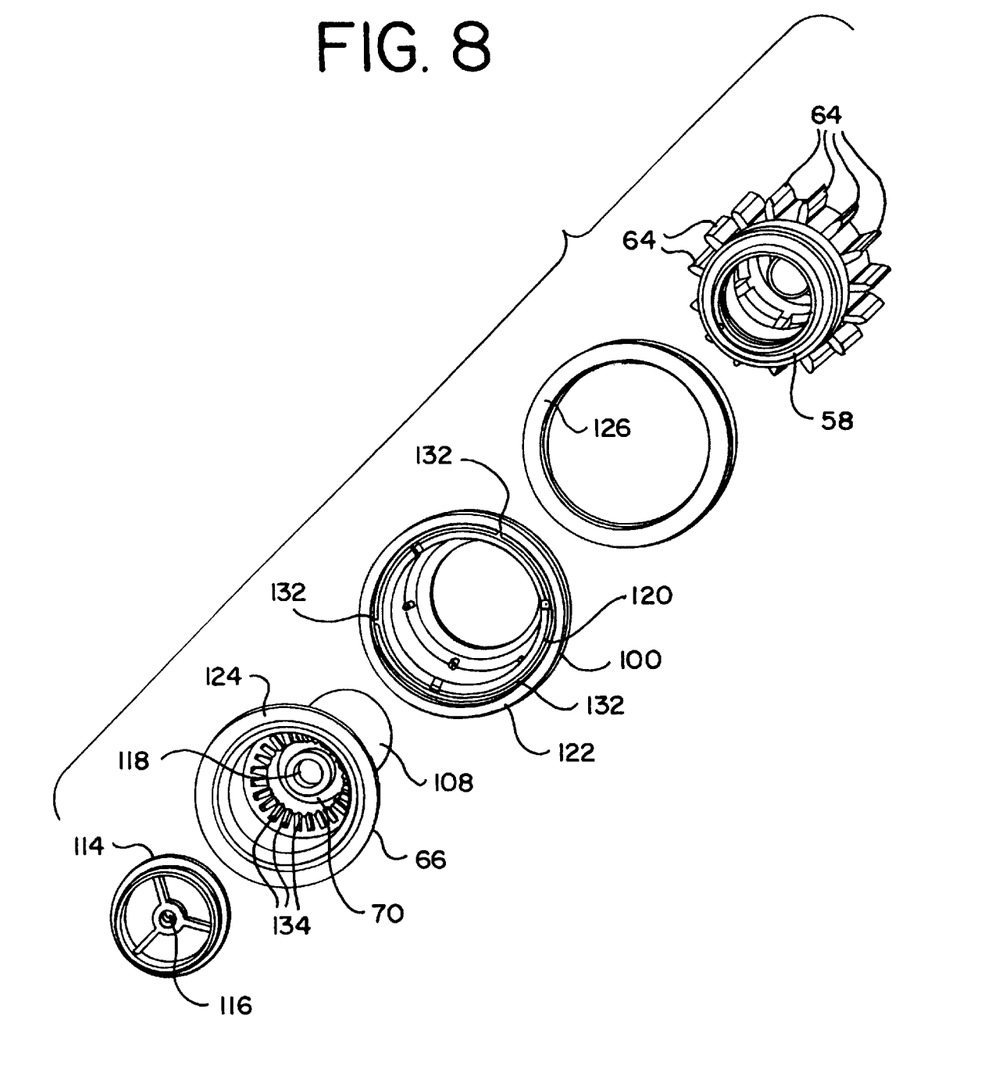
FIG. 8 is an exploded isometric top view of the components seen in FIG. 7.

For an application such as a urinal fixture where smaller burst flow volume is needed, the retainer 104 can extend axially downwardly so that it does not move clear of the bore 30A. This limits flow through the flush control valve assembly 14.

The lifting piston 66 includes a depending collar 108 slidably received within the timing sleeve 58. A sleeve seal 110 is held to the upper end of the timing sleeve 58 by a retainer 112 to seal the timing chamber 62. A baffle 114 includes a post 116 (FIG. 7) that is pressed into an apertured hub 118 (FIG. 8) in the wall 70. The orifice 72 is a slot in the post 116 (FIG. 7). A helical surface on the hub 118 (FIG. 8) enables the orifice size to be controlled by angularly positioning the baffle relative to the hub 118 thus varying the degree to which the slot 72 is exposed. This adjustment of the orifice size permits the burst valve flow volume to be tailored to specific fixture requirements.

The piston collar 100 surrounds the upper portion of, and is axially movable relative to, the lifting piston 66. The upper portion of the piston collar includes an outwardly directed valve seat portion 120 and an upwardly extending stop collar 122. The upper portion of the lifting piston includes an outwardly flared rim 124 that acts as a valve member and cooperates with the valve seat portion 120 to form the bypass valve 38 as seen in enlarged scale in FIGS. 4A and 5A. A piston sleeve seal 126 beneath the rim 124 isolates the inlet 26 from the lifting chamber 68.

FIG. 3 illustrates the assembly in the initial, standby position. The metering valve assembly 40 is closed and there is no flow between its inlet port 44 and outlet port 46. The burst valve 36 and the bypass valve 38 are closed. Inlet pressure from the inlet fitting 92 is present at the inlet annulus 26. Inlet pressure is communicated to the interior of the piston collar 100 through bleed slots 130 (FIG. 7) in the lower edge of the piston collar 100. Bleed grooves 132 (FIG. 8) in the valve seat 120 admit inlet pressure to the lifting chamber 68.

The inlet 26 communicates with the orifice 72 through strainer slots 134 extending through the lifting piston 66 (FIGS. 7 and 8) and along a clearance between the baffle 114 and the collar 108. Inlet pressure is communicated to the timing chamber 62 from the region below the baffle 114 through the orifice 72. The outlet bore 30A is at low pressure, and the pressure differential across the timing sleeve and the force applied by the spring 102 hold the timing sleeve 58, the lifting piston 66 and the piston collar 100 in their lowermost positions.

The actuator 32 is operated in order to initiate a flushing cycle. When the metering valve assembly 40 opens, the pressure at the inlet 44 drops and flow through the metering valve assembly empties the lifting chamber 68. The lifting piston 66 and the piston collar 100 move rapidly upward, opening the burst valve 36 and permitting relatively large volume flow for flushing the siphon fixture. The force of the spring 102 and the force resulting from the pressure differential across the piston 66 and collar 100 maintains the collar 100 against the piston 66 and holds the bypass valve 38 closed.

The timing sleeve 58 is lifted with the lifting piston 66. The volume of the timing chamber 62 cannot change quickly because of the flow restriction of the orifice 72 and the timing sleeve therefore cannot move quickly relative to the lifting piston 66.

When the burst valve 36 opens, water flows from the inlet 26 between the ribs 64 and through the outlet bore 30A. The ribs 64 permit high volume flush flow but impose a flow restriction sufficient to develop a force urging the timing sleeve 58 down relative to the lifting piston. This relative movement is gradual because the timing chamber 62 fills slowly through the orifice 72. When the lifting piston 66 and piston collar 100 reach their uppermost position seen in FIG. 4, the timing sleeve has moved downward through only a small part of its full range of movement relative to the lifting piston, and the burst valve 36 remains open. In this uppermost position, the stop collar 122 of the piston collar stops against a rim 136 of the hub 96.

Figure 4:
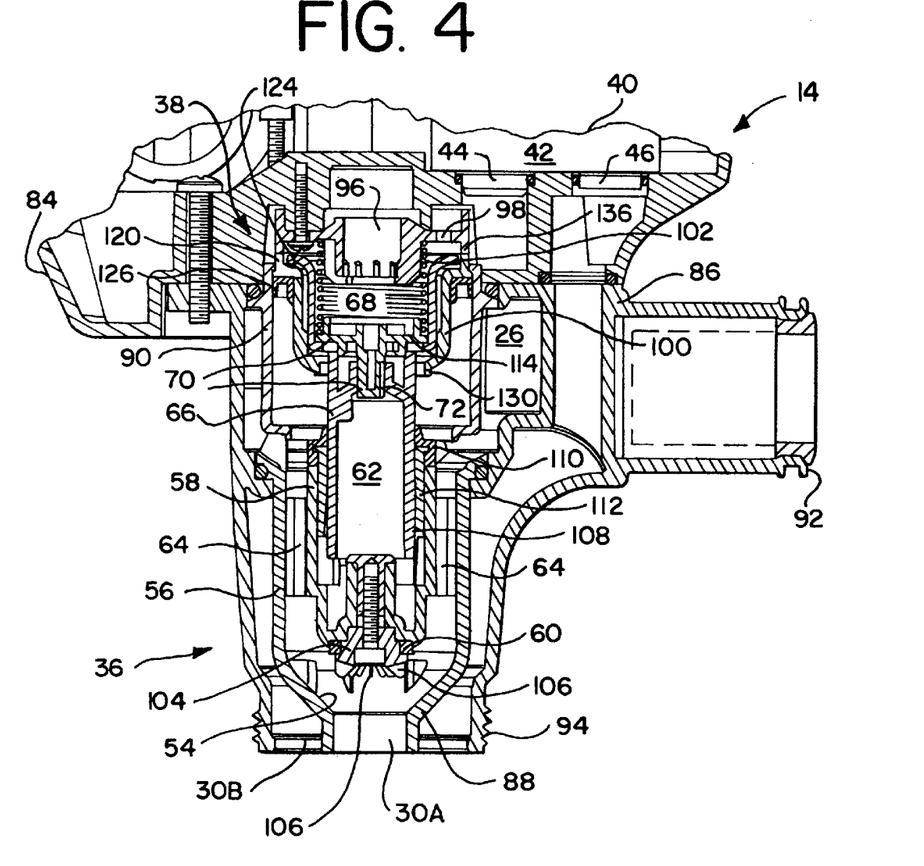
FIG. 4 is a fragmentary view similar to the lower portion of FIG. 3 illustrating the assembly shortly after actuation in a flush cycle.
Figure 4A:
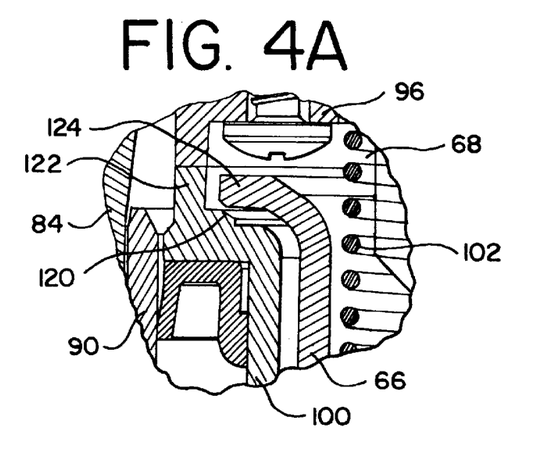
FIG. 4A is a greatly enlarged, fragmentary view of part of FIG. 4 illustrating the bypass valve partly open.

When the piston collar 100 reaches its uppermost position, the pressure acting across the lifting piston causes the bypass valve to open slightly as seen in FIG. 4A. This permits a small flow to reach the outlet 30B through the metering valve assembly. In addition, as the lifting piston 66 moves upwardly, water from the lifting chamber 68 reaches the outlet bore 30B. However the great majority of the water for flushing the fixture (in excess of ninety per cent) is supplied by flow through the burst valve 36.

The burst valve 36 remains open as the timing sleeve 58 gradually descends. The timing sleeve is shown midway in this movement in FIG. 4, some time after the piston collar has stopped and the bypass valve has partly opened.

Figure 5:
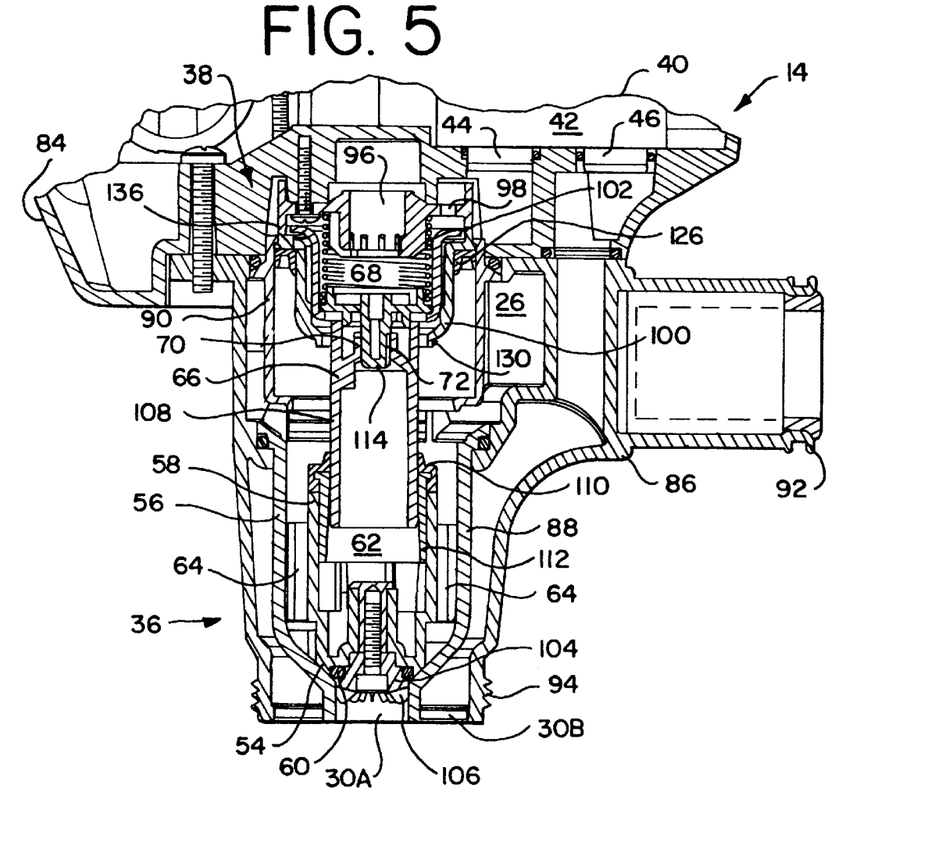
FIG. 5 is a view like FIG. 4 illustrating the assembly providing fixture trap reseal water flow later in the flush cycle.
Figure 5A:
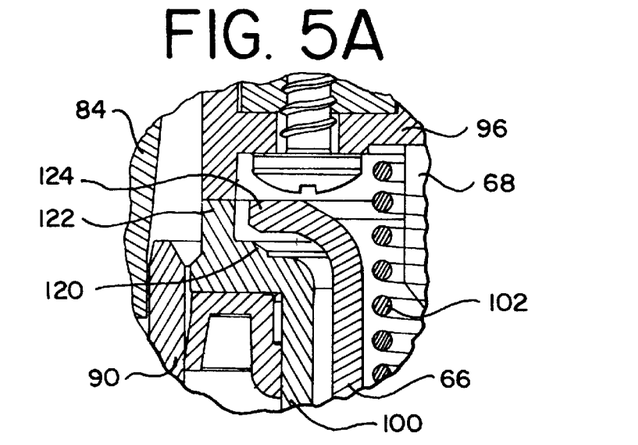
FIG. 5A is a view like FIG. 4A illustrating the bypass valve fully open.

As the timing sleeve approaches its lowermost position, the ribs 106 enter the bore 30A, and then the seal retainer chokes flow through the bore 30A. As seen in FIG. 5, the timing sleeve 58 returns to its lowermost position, and the burst valve closes. The volume of water delivered by the assembly 14 is very consistent over wide variations in inlet pressure. The independent control of flush water flow provides a clearly defined flush flow duration without a gradual transition and waste of water. The volume can be tailored to a particular fixture's flushing requirements by sizing the orifice 72.

While the timing sleeve is moving downwardly, downward force resulting from flow through the ribs 64 is transferred to the lifting piston because the orifice 72 prevents rapid volume change of the timing chamber 62. As a result, the bypass valve cannot open more than a slight amount (FIG. 4). When the burst valve 36 closes, and flow throughout the ribs 64 is discontinued, the flow induced downward force is also discontinued. As a result, the bypass valve 38 moves to the fully open position seen in FIG. 5A and water flows through the metering valve assembly 40 and outlet 30B for refilling the fixture trap. Orifices 98 in the hub 96 restrict this flow to a rate suited for resealing the fixture trap.

The metering valve assembly 40 closes when a predetermined volume of water flows through it from the bypass valve 38. This reseal flow volume is regulated independently of the regulation of the siphon flush flow through the burst valve 36 and can be tailored to the specific requirements of a fixture. When the metering valve assembly closes, all flow from the flush control valve assembly 14 to the fixture is discontinued.

After the metering valve assembly 40 closes, the lifting piston 66 and the piston collar 100 are moved by the return spring 102 gradually downward as seen in FIG. 6. These components return to their initial position seen in FIG. 3 in preparation for a next flushing operation. The grooves 132 permit gradual flow into the lifting chamber 68. Reverse flow from the timing chamber 62 backflushes the orifice 72.

While the present invention has been described with reference to the details of the embodiment of the invention shown in the drawing, these details are not intended to limit the scope of the invention as claimed in the appended claims.

What is claimed is:

1. A valve assembly for use with an actuation valve and a source of pressurized fluid for providing a two-stage flush flow for sanitary fixtures or the like, said valve assembly comprising:

a housing having a flush fluid inlet and a flush fluid outlet including a first outlet portion and a second outlet portion, wherein the actuation valve is disposed in at least a portion of said second outlet portion for controlling fluid flow through said second outlet portion; and dual valve means including:
      an expandable valve member disposed within said housing between said flush fluid inlet and said first and second outlet portions, and in fluid communication with said flush fluid inlet, said valve member having a proximal end which is capable of sealing off said first outlet portion, a distal end which forms a lifting chamber with said housing in fluid communication with said second outlet portion, an enclosed timing chamber disposed between said proximal and distal ends, at least one restricted opening between said lifting chamber and said flush fluid inlet for providing the pressurized fluid therein, and a restricted orifice fluidly connecting said timing chamber and said lifting chamber with the pressurized fluid; and a collar movably disposed around said distal end of said expandable valve member and forming therebetween an additional restricted flow path from said flush fluid inlet to said lifting chamber and into said second outlet portion when said expandable valve member is closed;

wherein activation of the actuation valve initiates a first stage flush by opening said second outlet portion to draw fluid out of said lifting chamber and to said second outlet portion, thereby drawing said dual valve means away from said first outlet portion to provide fluid communication between said fluid inlet and said first outlet portion, allowing said proximal end of said expandable valve member to move away from said first outlet portion to permit a primary flush fluid stream to exit through said first outlet portion, and allowing said collar to come to rest against said housing proximate a portion of said second outlet portion to enable opening of said restricted flow path;

wherein said distal end of said expandable valve member is drawn toward a portion of said second outlet portion and away from said collar to initiate a second stage flush by permitting a fluid stream to flow from said flush fluid inlet and out through a portion of said second outlet;

wherein said primary flush fluid stream flowing around said expandable valve member causes said valve member to expand through movement of said timing chamber and said lifting chamber; and wherein a second stage is initiated when said valve member expands to the extent that said proximal end seals off said first outlet portion to terminate said primary flush fluid stream, and wherein said secondary flush fluid flow continues through said restricted flow path and out said second outlet portion.

2. The valve assembly according to claim 1 further comprising a biasing means for urging said expandable valve member toward said first outlet portion.

3. The valve assembly according to claim 1 wherein said expandable valve member further comprising a timing sleeve and a lifting piston in sliding mating relationship with said timing sleeve.

4. A valve assembly for use with a source of pressurized fluid for providing a two-stage flush flow for sanitary fixtures or the like, said valve assembly comprising:

an actuation valve;

a housing having a flush fluid inlet and a flush fluid outlet including a first outlet portion and a second outlet portion, wherein said actuation valve is disposed in at least a portion of said second outlet portion for controlling fluid flow through said second outlet portion; and dual valve means including:
      an expandable valve member disposed within said housing between said flush fluid inlet and said first and second outlet portions, and in fluid communication with said flush fluid inlet, said valve member having a proximal end which is capable of sealing off said first outlet portion, a distal end which forms a lifting chamber with said housing in fluid communication with said second outlet portion, an enclosed timing chamber disposed between said proximal and distal ends, at least one restricted opening between said lifting chamber and said flush fluid inlet for providing the pressurized fluid therein, and a restricted orifice fluidly connecting said timing chamber and said lifting chamber with the pressurized fluid; and a collar movably disposed around said distal end of said expandable valve member and forming therebetween an additional restricted flow path from said flush fluid Inlet to said lifting chamber and into said second outlet portion when said expandable valve member is closed;

wherein activation of said actuation valve initiates a first stage flush by opening said second outlet portion to draw fluid out of said lifting chamber and to said second outlet portion, thereby drawing said dual valve means away from said first outlet portion to provide fluid communication between said fluid inlet and said first outlet portion, allowing said proximal end of said expandable valve member to move away from said first outlet portion to permit a primary flush fluid stream to exit through said first outlet portion, and allowing said collar to come to rest against said housing proximate a portion of said second outlet portion to enable opening of said restricted flow path;

wherein said distal end of said expandable valve member is drawn toward a portion of said second outlet portion and away from said collar to initiate a second stage flush by permitting a fluid stream to flow from said flush fluid inlet and out through a portion of said second outlet;

wherein said primary flush fluid stream flowing around said expandable valve member causes said valve member to expand through movement of said timing chamber and said lifting chamber; and wherein a second stage is initiated when said valve member expands to the extent that said proximal end seals off said first outlet portion to terminate said primary flush fluid stream, and wherein said secondary flush fluid flow continues through said restricted flow path and out said second outlet portion.

5. The valve assembly according to claim 4 wherein said actuation valve includes a metering means for metering fluid flow therethrough.

* * * * *